United States Patent

Sugiyama

[11] Patent Number: 6,141,381
[45] Date of Patent: Oct. 31, 2000

[54] MOTION COMPENSATION ENCODING APPARATUS AND MOTION COMPENSATION ENCODING METHOD FOR HIGH-EFFICIENCY ENCODING OF VIDEO INFORMATION THROUGH SELECTIVE USE OF PREVIOUSLY DERIVED MOTION VECTORS IN PLACE OF MOTION VECTORS DERIVED FROM MOTION ESTIMATION

[75] Inventor: Kenji Sugiyama, Yokosuka, Japan

[73] Assignee: Victor Company of Japan, Ltd., Yokohama, Japan

[21] Appl. No.: 09/065,365

[22] Filed: Apr. 23, 1998

[30] Foreign Application Priority Data

Apr. 25, 1997 [JP] Japan .................................. 9-123026

[51] Int. Cl.⁷ .................................................. H04N 7/36
[52] U.S. Cl. .................................. 375/240.16; 348/416.1
[58] Field of Search ............................ 375/240, 240.01, 375/240.12, 240.14, 240.16, 240.17; 348/384.1, 390.1, 400.1, 401.1, 402.1, 409.1, 415.1, 416.1, 699, 700; 382/232, 236, 238

[56] References Cited

U.S. PATENT DOCUMENTS

| | | | |
|---|---|---|---|
| 5,412,435 | 5/1995 | Nakajima | 348/699 |
| 5,565,922 | 10/1996 | Krause | 348/413 |
| 5,963,673 | 10/1999 | Kodama | 382/239 |

FOREIGN PATENT DOCUMENTS

4101490 C1   2/1992   Germany .

OTHER PUBLICATIONS

Sohail, Zafar et al. Predictive Block_Matching Motion Estimation Schemes for Video Compression Apr. 7–10, 1991 Part I, IEEE, p. 1088–1092.

Ya_Qin Zhang et al. Predictive Block_Matching Motion Estimation Schemes for Video Compression Part II, Apr. 7–10, 1991, IEEE, p. 1093–1095.

Primary Examiner—Bryan Tung
Attorney, Agent, or Firm—Anderson, Kill & Olick P.C.

[57] ABSTRACT

In a video motion compensation encoding apparatus in which each of periodically selected pictures is encoded as successive blocks of picture elements, by encoding of the prediction error amounts obtained for each block in conjunction with variable-length encoding by a motion vector encoder of motion vectors which are utilized in motion compensation processing to derive the prediction error amounts, each of these motion vectors is selected by a comparator-controlled switch either as an estimated motion vector derived by a conventional type of motion estimation section or as a predicted motion vector derived by a motion vector prediction section based on previously encoded motion vectors, with the estimated motion vector being selected only if it is found that an amount of prediction error which would occur from using the predicted motion vector is significantly greater than that which would result from using the estimated motion vector. A higher probability of encoding successively identical motion vectors is thereby achieved, resulting in greater encoding efficiency.

9 Claims, 10 Drawing Sheets

MOTION COMPENSATION ENCODING APPARATUS AND MOTION COMPENSATION ENCODING METHOD FOR HIGH-EFFICIENCY ENCODING OF VIDEO INFORMATION THROUGH SELECTIVE USE OF PREVIOUSLY DERIVED MOTION VECTORS IN PLACE OF MOTION VECTORS DERIVED FROM MOTION ESTIMATION

BACKGROUND OF THE INVENTION

1. Field of the Invention

The present invention relates to high-efficiency encoding of video information in the form of a stream of pictures expressed by a video signal, for the purpose of transmitting or storing the video information, whereby the pictures can be conveyed as a smaller amount of code than has been possible in the prior art.

2. Description of the Related Art

Typical methods of high-efficiency encoding of video information which are widely used at present are the MPEG-1 or MPEG-2 standards, i.e. Moving Picture Experts Group international encoding standards which have been set by the IEC/ISO. With an MPEG encoding system, certain periodically selected pictures (transmitted as respective frames of a digital video signal, each picture being conveyed as an array of pixels each expressed by a digitized sample) are encoded by motion compensation, with each picture being encoded as a set of blocks of pixels. With motion compensation, a part of a preceding picture is shifted spatially, such as to to derive predicted pixel values for a block which is being encoded. The requisite amount and direction of that shift is expressed as a motion vector, which is derived by a process referred to as motion estimation. The respective differences between the actual pixel values and the prediction values, referred to in the following as the prediction error values, are obtained and encoded using DCT conversion and variable-length encoding of the resultant coefficients. The motion vectors are generally derived for blocks of 8×8 or 16×16 element size, and the DCT generally applied to blocks of 8×8 values, however for simplicity of description it will be assumed in the following that the same block size (e.g., 8×8 elements) is utilized in all encoding/decoding operations.

Since it is necessary to use the prediction error amounts for the blocks in conjunction with the motion vectors for the blocks, at the time of subsequent decoding, the motion vectors are also encoded. This is done by variable-length encoding, such as Huffman encoding, since the motion vectors do not generally change substantially between successive blocks of a picture.

FIG. 11 is a general system block diagram of an example of a prior art type of motion compensation encoding apparatus which utilizes the above principles. In the following, when describing both this prior art example and embodiments of the present invention, only the encoding processing applied to those pictures which are encoded by motion compensation will be described.

In FIG. 11, a digital video signal from a video input terminal 1 is supplied to one input of a subtractor 2. In the following description of this prior art example and also in the subsequent description of embodiments of the invention, it is to be understood that such a digital video signal consists of successive digital samples expressing respective pixels, supplied to the input terminal 1 in the appropriate sequence for use by the encoding apparatus, i.e. so that successive blocks of pixels of a picture are operated on. A motion estimation section 15 operates on the input video signal to derive respective motion vectors for the blocks which are to be encoded, and supplies the motion vectors to a motion compensation section 8. As each pixel value of such a block which is being encoded is supplied to the subtractor 2, a corresponding prediction value for that pixel is derived by the motion compensation section 8 and supplied to the other input of the subtractor 2, to thereby derive the corresponding prediction error value. The prediction values are generated through motion compensation by the motion compensation section 8, i.e., by shifting a reconstructed picture (supplied from the picture memory 51) by an amount and direction specified by the corresponding motion vector, with that motion compensation typically using linear interpolation to achieve an accuracy of ½ pixel. The prediction error values thereby successively derived for the block are supplied to a DCT section 3. The DCT section 3 executes DCT conversion processing on that set of pixels, i.e., as a 2-dimensional (8×8) array of values, and supplies the resultant set of DCT coefficients for the block to a quantizer 4. The quantizer 4 performs quantization of the DCT coefficients using a predetermined quantization step size, and supplies the resultant values to a variable-length encoder 5 and to a dequantizer 12, as a 2-dimensional array of quantized coefficients.

The variable-length encoder 5 performs conversion of each of these 2-dimensional arrays to a 1-dimensional set of values by array conversion, using zigzag scanning, with Huffman encoding then being applied to express the resultant sequence of values as runs of consecutive 0 values and runs of values other than 0. In that way, respective bit streams are derived for the prediction error values of each of the blocks of a picture which is being encoded, and are successively supplied to a multiplexer 6, to be multiplexed with bit streams which are derived by encoding the motion vectors which are derived for that picture. The resultant code stream is supplied to a code output terminal 7.

The dequantizer 12 and inverse DCT section 11 perform inverse processing to that executed by the quantizer 4 and the DCT section 3 on a block which is being encoded, to reconstruct the respective prediction error values for each of the pixels of the block. As each such pixel prediction error value is thereby reconstructed, it is added in an adder 10 to a prediction value which has been derived by the motion compensation section 8 to thereby obtain respective reconstructed values for each of the pixels of a picture, with resultant reconstructed pictures being stored in the picture memory 51, to be supplied to the motion compensation section 8.

The motion vectors derived by the motion estimation section 15 are also supplied to a motion vector encoder 13. Typically, the motion vectors are derived to an accuracy of ½ pixel for each block.

The motion compensation section 8 receives from the picture memory 51 the pixel values of a previously encoded picture, i.e., a picture which has been reconstructed, and which is to be used as a reference picture, selects a region of the reference picture that is determined by the motion vector for a block which is being encoded, and successively outputs to the subtractor 2 successive pixel values of that reference picture region, as a motion compensation prediction signal, to be subtracted from the actual pixel values of the input video signal, and thereby derive the aforementioned prediction error values.

Typically, the motion compensation section 8 will utilize linear interpolation in deriving the motion compensation prediction signal, enabling an accuracy of ½ pixel to be attained for motion prediction.

The motion vector encoder 13 compares the x and y-direction components of the motion vector of a block which is to be encoded with those of the motion vector of the immediately preceding encoded block and performs Huffman encoding of the resultant difference values, with the resultant bit streams being supplied to the multiplexer 6 to be multiplexed with the bit streams which are obtained for the prediction error values as described above.

A decoding apparatus corresponding to the motion compensation encoding apparatus of FIG. 11 will be described in the following, referring to the general system block diagram of such a decoding apparatus which is shown in FIG. 12. Here, an input code stream which has been generated by the motion compensation encoding apparatus of FIG. 11 is supplied to an input terminal 61 and is separated by the demultiplexer 62 into the bit streams for the aforementioned prediction error values of respective (8×8) blocks of a picture which has been encoded by motion compensation and the bit streams for the motion vectors which were derived for that picture. The prediction error value bit streams are restored to fixed-length code form by the variable-length decoder 63, and reconstructed prediction error values for respective blocks of a picture which is being decoded are then obtained by the dequantizer 72 and the inverse DCT section 71. The respective prediction error values for pixels of a block which is being decoded are successively supplied to a adder 70. Predicted pixel values, derived by motion compensation, are supplied from a motion compensation section 78 to the other input of the adder 70, to thereby obtain reconstructed pixel values for the picture which is being decoded.

These reconstructed pixel values are supplied to a output video terminal 64, and also to a picture memory 52, to be temporarily stored for use as a reconstructed reference picture.

The bit streams for the motion vectors are supplied to a motion vector decoder 65, which derives decoded motion vectors, and supplies that information to the motion compensation section 78. The motion compensation section 78 derives respective motion-compensated predicted pixel values, using the motion vector information supplied from the motion vector decoder 65 in conjunction with reconstructed reference picture values supplied from the picture memory 52, and supplies these predicted values to the adder 70. It can be understood that the dequantizer 72, the inverse DCT section 71, the adder 70, the picture memory 52 and the motion compensation section 78 of this decoding apparatus respectively operate in the same manner as for the dequantizer 12, the inverse DCT section 11, the subtractor 10, the picture memory 51 and the motion compensation section 8 of the encoding apparatus of FIG. 11.

The motion vector bit streams which are separated from the input code stream by the demultiplexer 62 are converted from variable-length encoding form to fixed-length code by the motion vector decoder 65, and each of the motion vectors which are thereby obtained is added to the motion vector obtained for the preceding block, to thereby obtain information specifying a motion vector for the block which is currently being decoded, which is supplied to the motion compensation section 78.

With a prior art motion compensation encoding apparatus, the motion vectors which are obtained by motion estimation are directly encoded, without change. The operation of a motion estimation section such as the motion estimation section 15 of FIG. 11 serves to derive, for each block, the motion vector which will result in the smallest amount of prediction error. In that way, the amount of code which is generated as encoded prediction error values will be minimized. However, there are many cases in which the derivation of such optimum motion vectors by motion estimation will result in an excessive amount of code being derived for the motion vectors. This is due to the fact that with variable-length encoding of the motion vectors, the amount of motion vector code which is generated (e.g. by the motion vector encoder 13 of FIG. 11) is determined by the numbers of continuous runs of the same motion vectors. However if only the optimum motion vectors are always utilized, then even if the amount of reduction of prediction error value code that would result from using a different motion vector for the current block (i.e., different from the motion vector derived for the preceding block) is very small, that different motion vector will invariably be utilized. This can result in unnecessary amounts of motion vector code being generated, leading to a lowering of overall encoding efficiency.

Since there is no control of the amount of code which is generated by encoding the motion vectors, if that amount become excessively large, the amount of code which is generated from the prediction error values will be suppressed. This problem is especially severe when the block size that is utilized for motion compensation is small, and when highly accurate motion compensation is executed.

SUMMARY OF THE INVENTION

It is an objective of the present invention to overcome the above problems of the prior art by providing a motion compensation encoding apparatus for encoding an input digital video signal by processing in which periodic pictures expressed by the video signal are encoded by motion compensation encoding, whereby a motion vector is predicted for each of respective blocks of picture elements of a picture which is to be encoded, with that prediction being based on motion vectors which have already been encoded, and whereby if there is no more than a predetermined difference between an amount of prediction error that results from using the predicted motion vector in motion compensation encoding of a block and the amount of prediction error which results from using a motion vector derived by motion estimation to perform such motion compensation encoding, then the motion vector which is obtained by motion prediction is utilized for executing the motion compensation encoding.

In that way a motion compensation encoding apparatus can be realized whereby the amount of code which is generated by encoding the motion vectors can be reduced, such as to reduce the overall rate of generation of code by the motion compensation encoding apparatus.

Furthermore with the present invention, it becomes possible to control the proportion of predicted motion vectors which are selected to be encoded and to be used in motion compensation processing (i.e., to control the average rate of selection of predicted motion vectors rather than estimated motion vectors) in accordance with one or more operating conditions of the motion compensation encoding apparatus. Specifically, that control can be executed in accordance with the amounts of code which are being successively generated through encoding of the motion vectors.

In addition, the invention provides a high-efficiency encoded recorded medium, having recorded thereon code expressing video information which has been derived as described above.

Furthermore the invention provides a method of motion compensation encoding, utilizing the principles described above.

More specifically, according to a first aspect the invention provides a motion compensation encoding apparatus for converting a stream of pictures expressed by an input video signal into a code stream including encoded motion vectors corresponding to respective blocks of picture elements of said pictures, said blocks having been encoded by motion compensation, the apparatus comprising:

motion estimation means for deriving, for each of said blocks, a corresponding estimated motion vector, first error amount detection means for deriving, for said each block, a block prediction error amount which results from using said corresponding estimated motion vector to predict respective values of the picture elements of said block by motion compensation prediction, motion vector prediction means for utilizing at least one previously encoded motion vector to derive a predicted motion vector for said each block, second error amount detection means for deriving a second block prediction error amount which results from using said predicted motion vector to predict said values of the picture elements of said block by motion compensation prediction, comparator means for comparing said first block prediction error amount and second block prediction error amount, to produce a comparison output indicative of a smaller one of said first block prediction error amount and second block prediction error amount, and selector means responsive to said comparison output for selecting one of said estimated motion vector and predicted motion vector to be applied in motion compensation encoding of said each block and to be encoded as part of said encoded motion vectors.

Such a motion compensation encoding apparatus preferably further comprises adjustment means for adjusting at least one of said first block prediction error amount and second block prediction error amount, prior to execution of said comparison by said comparator means, in a direction tending to make the second block prediction error amount smaller than the first block prediction error amount. In that way, the predicted motion vectors will tend to be selected more than the estimated motion vectors, i.e. the average rate of selection of predicted motion vectors to be used in motion compensation processing and to be encoded will be increased, with the increase being in accordance with the degree of adjustment provided by the adjustment means. The adjustment can be performed for example by multiplying the block prediction error amount values obtained for the predicted motion vectors by a factor which is smaller than one, before executing the comparison with the block prediction error amount values obtained for the case of using the estimated motion vectors, or by subtracting a specific numeric value from the block prediction error amount values obtained for the case of using the predicted motion vectors.

According to a second aspect, such a motion compensation encoding apparatus comprises code amount calculation means for measuring amounts of code which are generated by said apparatus, and adjustment control means responsive to measurement results obtained by said code amount calculation means for controlling said adjustment means such as to increase a degree of said adjustment when relatively large amounts of said code are generated, and to decrease said degree of adjustment when relatively small amounts of said code are generated.

Alternatively, such a motion compensation encoding apparatus may include quantization means and quantization control section for generating a step size control signal to determine a quantization step size which is utilized by said quantization means, with the apparatus further comparing adjustment control means responsive to said step size control signal for controlling said adjustment means such as to increase a degree of said adjustment when said step size is large and to decrease said degree of adjustment when when said step size is small.

The invention further provides a motion compensation encoding method for converting a stream of pictures expressed by a video signal into a code stream including encoded motion vectors, said motion vectors corresponding to respective blocks of picture elements of said pictures, the method comprising:

deriving, for each of said blocks, a corresponding estimated motion vector, deriving, for said each block, a block prediction error amount which results from using said corresponding estimated motion vector to predict respective values of the picture elements of said block by notion compensation prediction, utilizing at least one previously encoded motion vector to derive a predicted motion vector for said each block, deriving a second block prediction error amount which results from using said predicted motion vector to predict said values of the picture elements of said block by motion compensation prediction, comparing said first block prediction error amount and second block prediction error amount, to find a smaller one of said first block prediction error amount and second block prediction error amount, and selecting, in accordance with a result of said comparison, one of said estimated motion vector and predicted motion vector to be applied in motion compensation encoding of said each block and to be encoded as part of said encoded motion vectors.

The present invention provides two basic advantages, with respect to encoding of motion vectors. Firstly, if a substantial increase in prediction error will not result from using a predicted motion vector (derived from motion vectors that have already been encoded) rather than using a motion vector derived by motion estimation, then the predicted motion vector will be utilized. This increases the probability that runs of identical motion vectors will be encoded, thereby ensuring a reduction in the amount of code which is generated by variable-length encoding of the motion vectors.

Secondly, it becomes possible to control the amounts of code which are generated from encoding the motion vectors. That is to say, the invention enables the proportion of predicted motion vectors which are selected for use in motion compensation to be determined based on a maximum permissible amount of prediction error which can be produced by encoding a block, with the degree of that permissible amount being set by the aforementioned adjustment factor. That adjustment factor can be fixedly predetermined at a suitable value, or can be controlled in accordance with changes in a rate of generation of code by the apparatus, e.g., in accordance with the rate of generation of code by encoding the motion vectors. In that way, the invention enables prevention of excessive amounts of code being generated by encoding of motion vectors. The adjustment factor may also be controlled in accordance with the value of quantization step size which is being utilized in quantizing the DCT coefficients obtained for the prediction error amounts of a block, to set the proportion of predicted motion vectors that are selected to a suitable value in relation to the quantization step size.

Furthermore, the invention provides an encoded recorded medium having recorded thereon high-efficiency encoded information obtained by converting a stream of pictures expressed by a video signal into a code stream including encoded motion vectors, said motion vectors corresponding to respective blocks of picture elements of said pictures, said encoded motion vectors having been obtained by:

deriving, for each of said blocks, a corresponding estimated motion vector, deriving, for said each block, a block prediction error amount which results from using said corresponding estimated motion vector to predict respective values of the picture elements of said block by motion compensation prediction, utilizing at least one previously encoded motion vector to derive a predicted motion vector for said each block, deriving a second block prediction error amount which results from using said predicted motion vector to predict said values of the picture elements of said block by motion compensation prediction, comparing said first block prediction error amount and second block prediction error amount, to find a smaller one of said first block prediction error amount and second block prediction error amount, and selecting, in accordance with a result of said comparison, one of said estimated motion vector and predicted motion vector to be encoded as part of said encoded motion vectors.

BRIEF DESCRIPTION OF THE DRAWINGS

FIG. 2 conceptually illustrates the selection of motion vectors derived by motion estimation and by motion vector prediction, while

DESCRIPTION OF PREFERRED EMBODIMENTS

Figure 1:
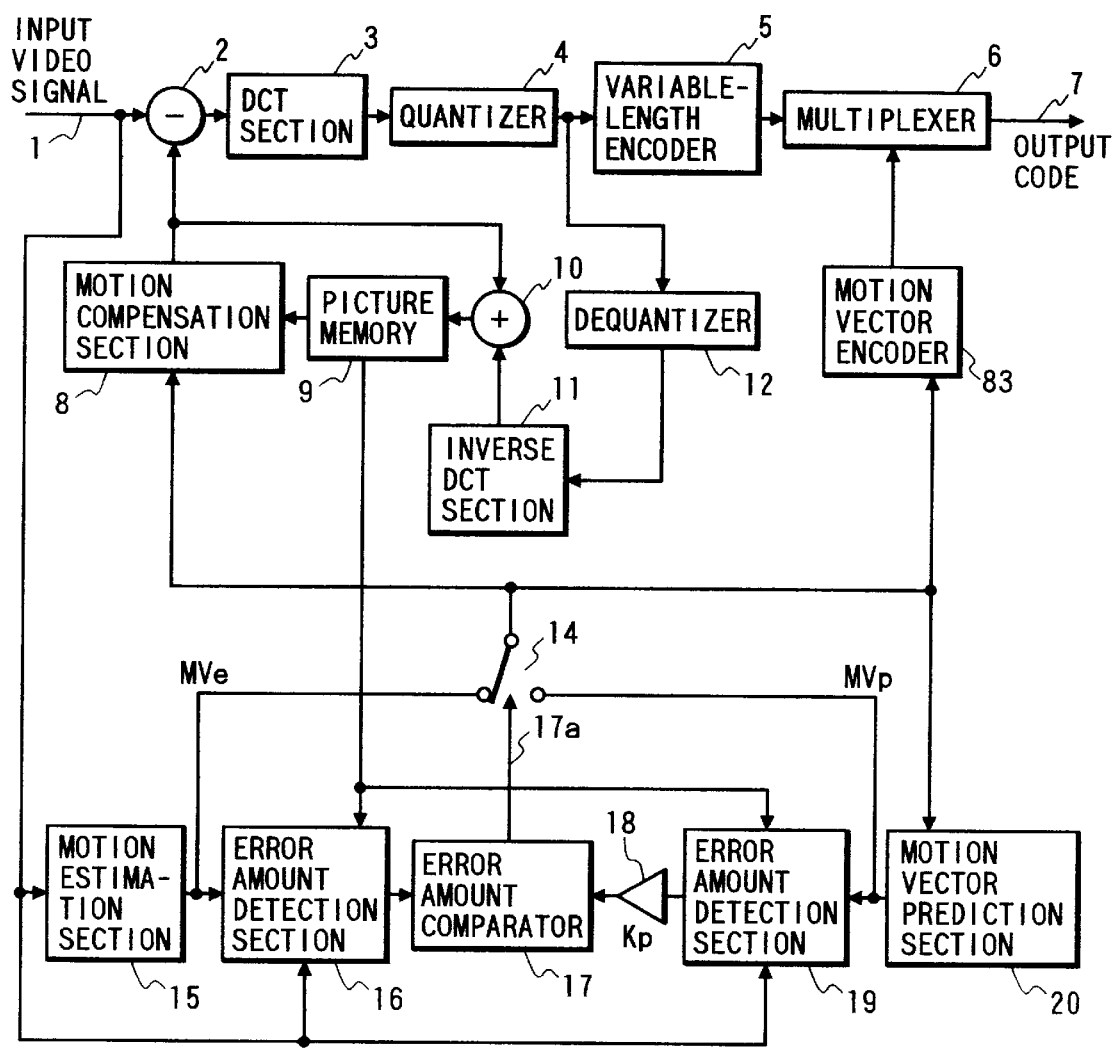
FIG. 1 is a general system block diagram of a first embodiment of a motion compensation encoding apparatus according to the present invention.
Figure 11:
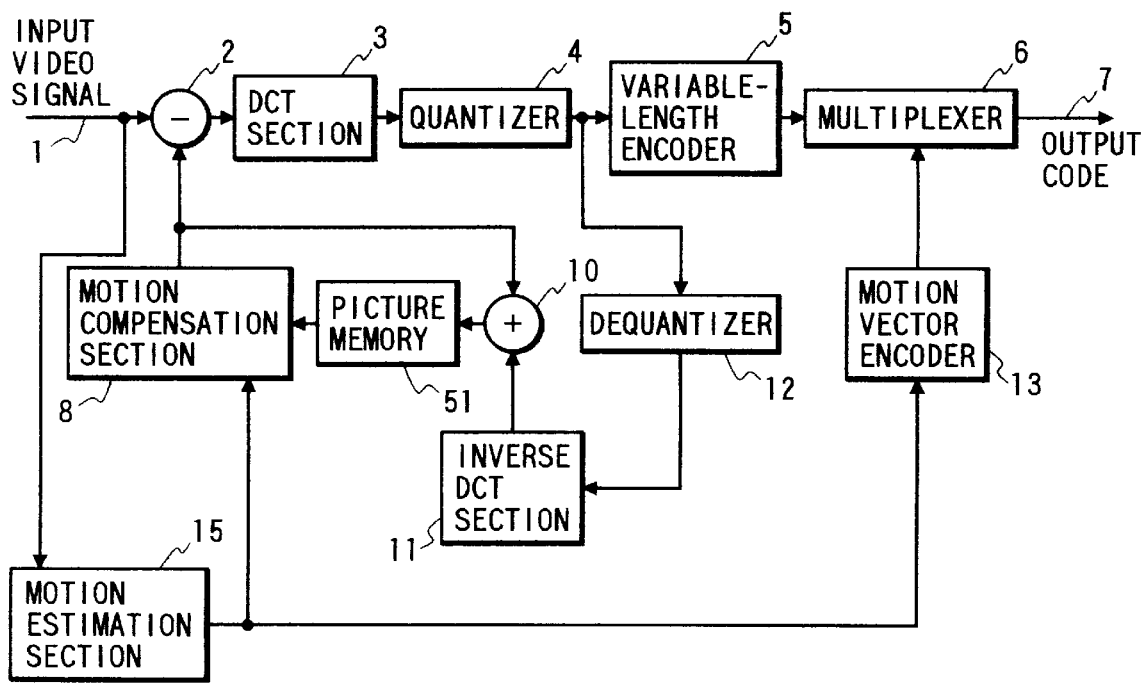
FIG. 11 is a general system block diagram of an example of a prior art type of motion compensation encoding apparatus.

A first embodiment of a motion compensation encoding apparatus according to the present invention will be described in the following. FIG. 1 is a general system block diagram showing the configuration of this embodiment. In FIG. 1, component which correspond to component in the prior art example of FIG. 11 are indicated by identical reference numerals. This embodiment differs from FIG. 11 in that it includes error amount detectors 16, 19, an error amount comparator 17, a factor multiplier 18, a motion vector switch 14 and a motion vector prediction section 20, while in addition, the operation of the picture memory 9 is somewhat different from that of the example of FIG. 11, and the embodiment preferably utilizes a motion vector encoder 83 which is a modification of the motion vector encoder 13 of FIG. 11 as described hereinafter. This embodiment also differs from the prior art example in that an operation of judging motion vectors is executed as described hereinafter, however the motion compensation encoding processing is identical to that of the prior art example. Hence, the operation of each of the video input terminal 1, the subtractor 2, the DCT section 3, the quantizer 4, the variable-length encoder 5, the multiplexer 6, the video output terminal 7, the motion compensation section 8, the dequantizer 12, the inverse DCT section 11 and the adder 10 of FIG. 1 is identical to that of the corresponding component of the prior art example.

The motion estimation section 15 derives an estimated motion vector (designated in the following as MVe) for each block in the same way as for the prior art example, and supplies this to the error amount detection section 16 and to one of the selection terminals of the motion vector switch 14. The motion vector prediction section 20 receives from the motion vector switch 14 the successive motion vectors which are selected by the motion vector switch 14 to be encoded by the motion vector encoder 83 and utilized in motion compensation processing by the motion compensation section 8, and derives a predicted motion vector for the current block which is to be encoded, based upon the motion vectors which have been already encoded, with such a predicted motion vector being designated in the following as MVp.

The simplest method of motion vector prediction is to use as MVp the motion vector which has been obtained and encoded for the immediately preceding block, in the sequence of encoding successive blocks of a picture. In that case, the motion vector prediction section 20 can derive each predicted motion vector simply by delaying each input thereto by a time delay equal to the block encoding period, i.e the period of encoding successive arrays of prediction error values for respective blocks by the DCT section 3 etc. The predicted motion vector MVp for a block which is to encoded is supplied from the motion vector prediction section 20 to the error amount detection section 19 and to the other selection terminal of the motion vector switch 14.

Figure 2:
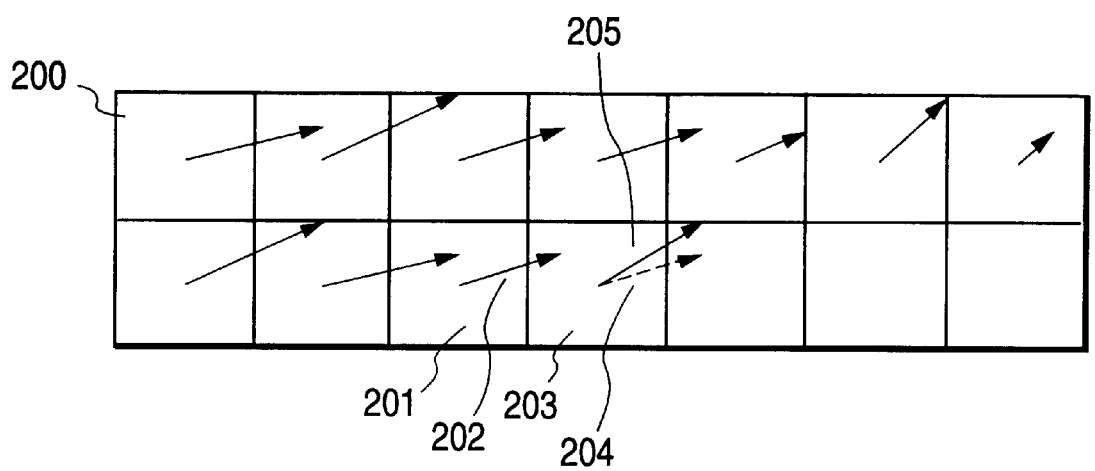

FIG. 2 illustrates the basis for using the estimated motion vectors and predicted motion vectors as described above. In FIG. 2, numeral 200 designates a part of a picture which is being encoded, with motion vectors of respective blocks designated by arrow lines. Assuming that block 203 is currently the block which is to be encoded, then 201 denotes the preceding block, for which a motion vector 202 was selected by the motion vector switch 14 to be encoded and to be used in motion compensation processing of block 201. 205 denotes a motion vector which is derived by motion estimation for block 203, while 204 denotes a predicted motion vector MVp which is derived by the motion vector prediction section 20 for that block. In the simplest case as described above, the predicted motion vector 204 may be made identical to the last motion vector to be encoded, i.e. motion vector 202. The basis of the invention lies in the fact that in many cases, the motion vectors 204, 204 will be closely mutually similar.

Motion compensation processing of the same type as that performed by the motion compensation section 8 is applied for the block which is being encoded, by the error amount detection section 16 and by the error amount detection section 19 simultaneously, using the estimated motion vector MVe and predicted motion vector MVp which are respectively derived for that block by the motion estimation section 15 and the motion vector prediction section 20. The motion compensation utilizes pixel values of a reference picture which are supplied from the picture memory 9. Each of the error amount detection section 16 and the error amount detection section 19 thereby derives an amount of prediction error for that block, with respect to the actual pixel values of the reference picture. The block prediction error amount (designated in the following as AEe) which is derived by using a motion-estimated motion vector MVe is supplied from the error amount detection section 16 to one input of the error amount comparator 17. The block prediction error amount AEp which is derived for that block as a result of using a predicted motion vector MVp is supplied from the error amount detection section 19 to the other input of the error amount comparator 17, after having been multiplied by a predetermined adjustment factor Kp, in the factor multiplier 18. The value of the adjustment factor Kp is preferably approximately 0.9.

The error amount comparator 17 compares the magnitudes of the block prediction error amount AEe and of the block prediction error amount AEp multiplied by the factor Kp, and generates a comparison output signal 17a which takes either of two values in accordance with whether AEe or (Kp.AEp) is the smaller of the two, and applies that comparison output signal as a selection control signal to the motion vector switch 14. The motion vector switch 14 thereby selects either MVe or MVp to be used in encoding the current block in accordance with the following rule:

if AEe<Kp.AEp, then the motion vector MVe is selected, if AEe>Kp.AEp, then the motion vector MVp is selected.

The motion vector which is thereby selected is used by the motion compensation section 8 to generate predicted pixel values for that block, and is also supplied to the motion vector encoder 83 and to the motion vector prediction section 20.

Figure 4:
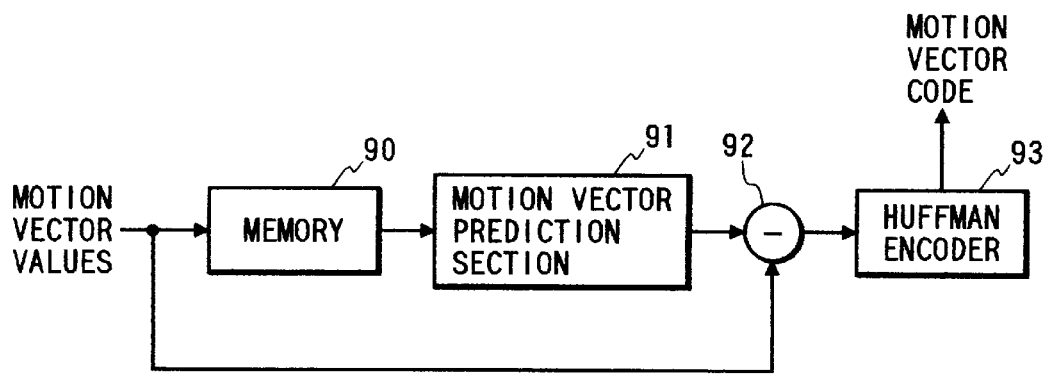
FIG. 4 is a block diagram of an example of the configuration of a motion vector encoder used in the embodiment of FIG. 1.

The operation of the motion vector encoder 83 is basically similar to that of the motion vector encoder 13 of the prior art example, however it is preferable to configure the motion vector encoder 83 to derive successive predicted motion vectors in the same way as is done by the motion vector prediction section 20, to obtain the difference between each such predicted motion vector and the motion vector which is selected by the motion vector switch 14 for the current block, and apply variable length coding to the differences thereby obtained. FIG. 4 shows an example of how the motion vector encoder 83 of this embodiment could be configured.

In the case of the simplest method of deriving the prediction motion vectors, described hereinabove, the operation of the motion vector encoder 83 is essentially identical to that of the motion vector encoder 13 of the prior art example.

Figure 3:
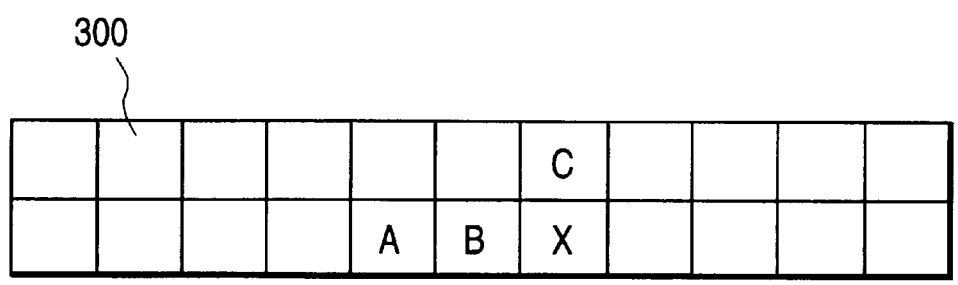
FIG. 3 illustrates possible methods of prediction.

Various methods of motion vector prediction are possible, as will be described referring to FIG. 3. It will be assumed that a block X, of a set of blocks of a picture which is being encoded, is the block which is currently to be encoded, with the blocks being sequentially encoded as successive lines, from top to bottom, and from left to right, as viewed in FIG. 3. In that case, the simplest method of prediction, as described above, is that in which the motion vector which was encoded for block B would be selected to be used for block X. However another possible method would be to derive a predicted motion vector for block X based on a combination of the motion vectors which were selected for blocks A and B, i.e. two horizontally adjacent blocks. Alternatively, adaptive prediction could be utilized, for example by selecting either the motion vector of a horizontally adjacent block or of a vertically adjacent block, as is appropriate.

Figure 5:
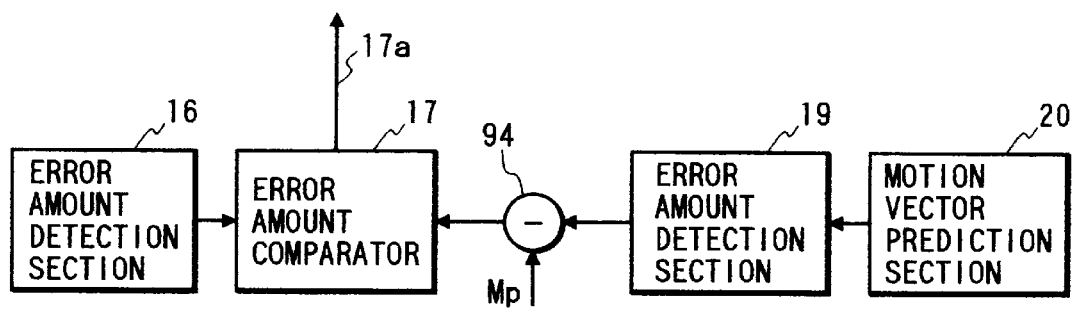
FIG. 5 is a partial system block diagram showing a modification of the embodiment of FIG. 1, whereby error amount adjustment is performed by subtractor rather than by factor multiplication.

Furthermore apart from the method described above, of multiplying the block error amount AEp by the adjustment factor Kp for thereby adjusting that error amount, another possible adjustment method would be to subtract an adjustment value Mp from that block error amount, with the embodiment of FIG. 1 being modified as illustrated in the partial block diagram of FIG. 5, or to subtract an adjustment value from each of the error values which are derived for respective pixels of a block. Assuming that the error value thereby derived for a pixel is a value in the range 0 to 255, the latter adjustment value could for example be made 1 or 2.

Alternatively, instead of applying adjustment to the error amount AEp which is derived by the error amount detection section 19, it would be equally possible to apply such adjustment by multiplying the error amount AEe that is derived by the error amount detection section 16, by a factor which is greater than one, e.g., approximately 1.1, or to add a suitable adjustment value to the error amounts which are obtained (using motion vector MVe) for respective pixels of the block being encoded. Whichever method is used, adjustment must be applied in a direction such as to make the value of the error amount AEp (as supplied to the error amount comparator 17) smaller in relation to the error amount AEe.

It can thus be understood that similar effects to those described above for the first embodiment can be achieved by utilizing such other methods of adjustment of the relative amounts of block prediction error.

Figure 6:
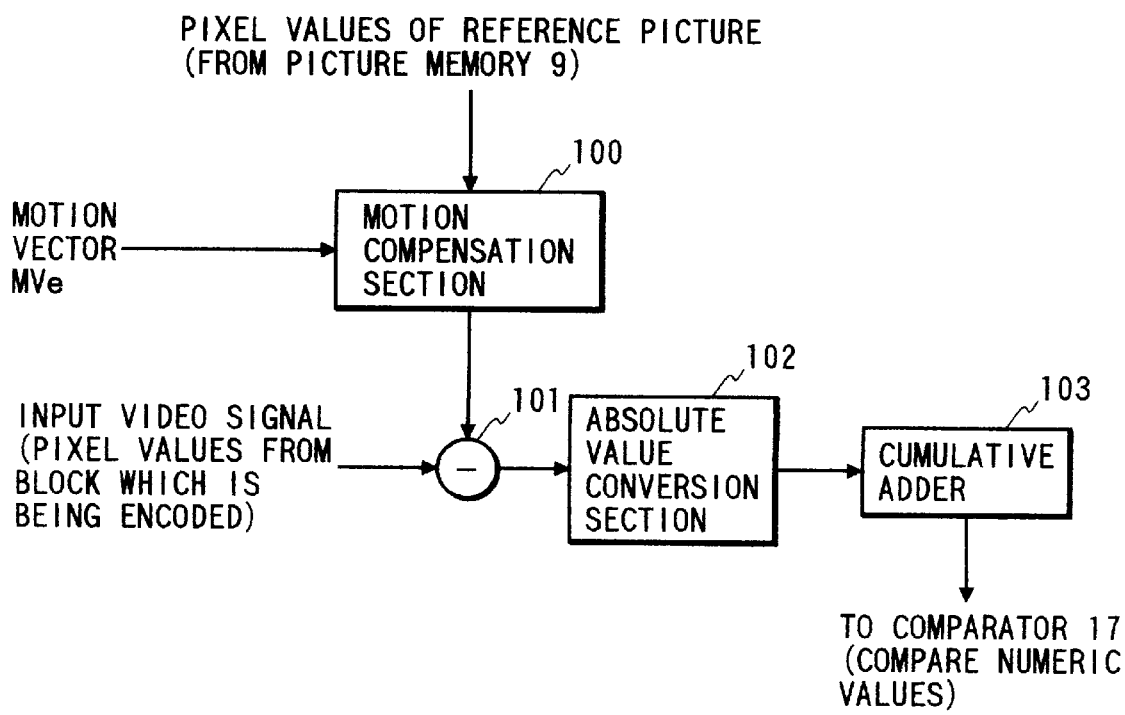
FIG. 6 is a block diagram showing an example of the configuration of an error amount detection section used in the embodiment of FIG. 1.

The error amount detectors 16, 19 can in general each be configured such as to obtain the error amount for a block as the cumulative sum of the respective absolute values of motion compensation prediction error which are derived for the pixels of the block, or the sum of the squares of the respective prediction error values obtained for these pixels. FIG. 6 is a block diagram showing an example of the configuration of the error amount detection section 16, for the case of absolute values being utilized. Here, a motion compensation section 100 receives an estimated motion vector MVe from the motion estimation section 15 and pixel values of a reference picture from the picture memory 9, and uses these to derive predicted pixel values for the block which is to be encoded, supplying these values to one input of a subtractor 101. The actual pixel values for that block are supplied to the other input of subtractor 101, to thereby obtain respective prediction error values for these picture elements, which are converted to respective absolute values by an absolute value conversion section 102, with these values being summed by a cumulative adder 103 to thereby obtain a total absolute value of the amount of prediction error for the block.

The corresponding configuration for the error amount detection section 19 is identical to that shown in FIG. 6, but with the predicted motion vector MVp being supplied to the motion compensation section 100.

Figure 7:
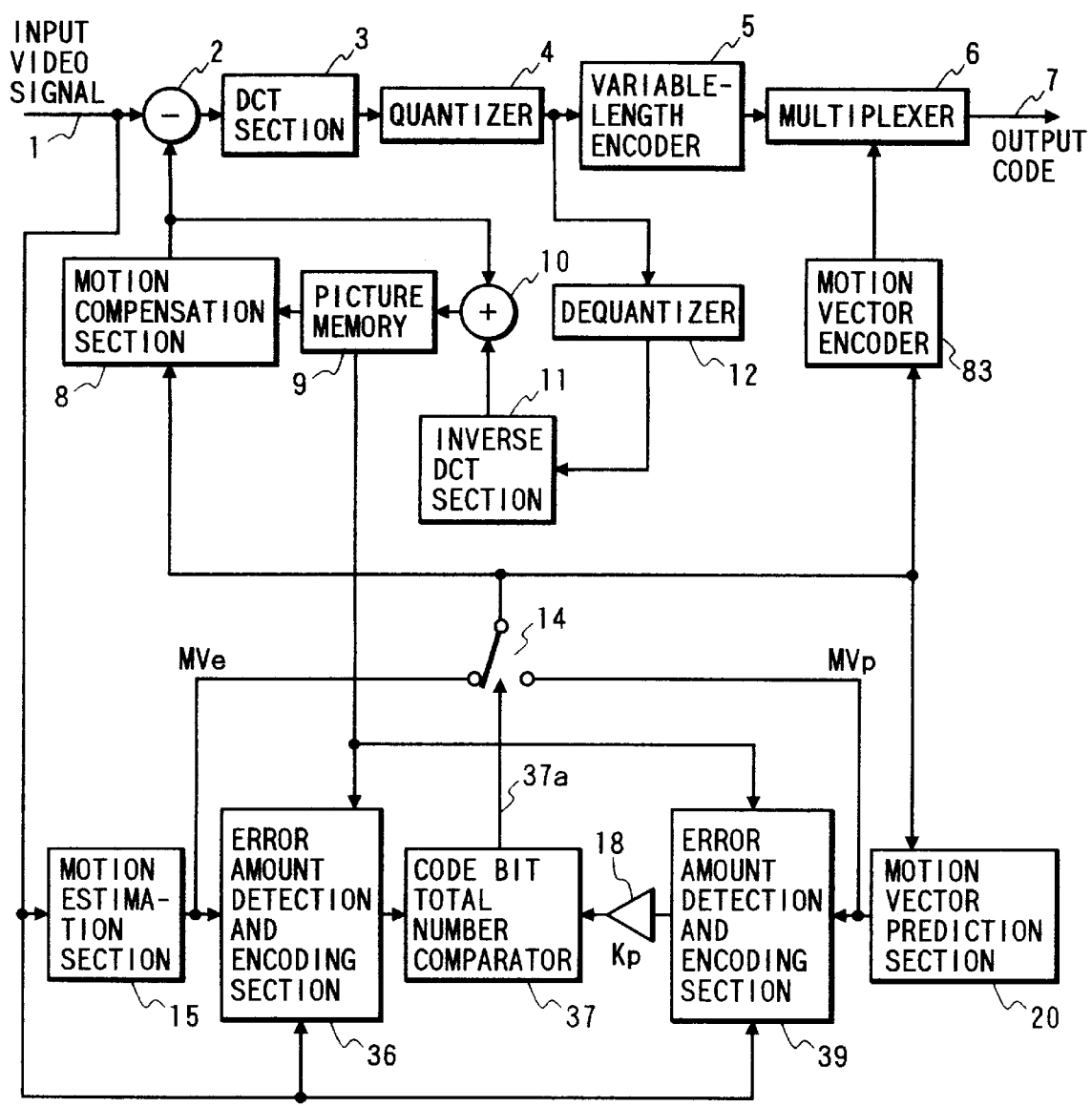
FIG. 7 is a general system block diagram of a modified version of the first embodiment, in which amounts of code which are generated by utilizing respective prediction error amounts derived for a block are compared.

To attain a higher accuracy of judging the respective error amounts which are obtained for a block, for the cases of using MVe and MVp respectively, it is possible to use a more complex system configuration whereby the same encoding processing is executed as that performed by the DCT section 3, the quantizer 4 and the variable-length encoder 5. That is to say, it becomes possible to derive the actual total amounts of code which would be derived for the case of using the estimated motion vector MVe and the predicted motion vector MVp respectively to encode a block, and to compare these code amounts, after applying adjustment. Such judgement based on actual amounts of code is more precise than a judgement based upon only the amounts of prediction error, however the necessary amount of processing is increased. FIG. 7 is a general system block diagram of a modification of the first embodiment of FIG. 1, whereby such actual amounts of code are derived and judged. In FIG. 7, error amount detection and encoding sections 36 and 39 each encode a set of prediction error values which are generated for the block which is being encoded, i.e. respectively operating on the prediction error values which are produced in the case of using the estimated motion vector MVe and in the case of using the predicted motion vector MVp. After adjustment has been applied, e.g., by multiplying by Kp the amount of code which is generated by the error amount detection and encoding section 39, the resultant code amounts which are generated by sections 36, 39 are compared by the code bit total number comparator 37, and the resultant comparison signal 37a is applied to control the motion vector switch 14 in the same manner as described for the first embodiment of FIG. 1.

Figure 8:
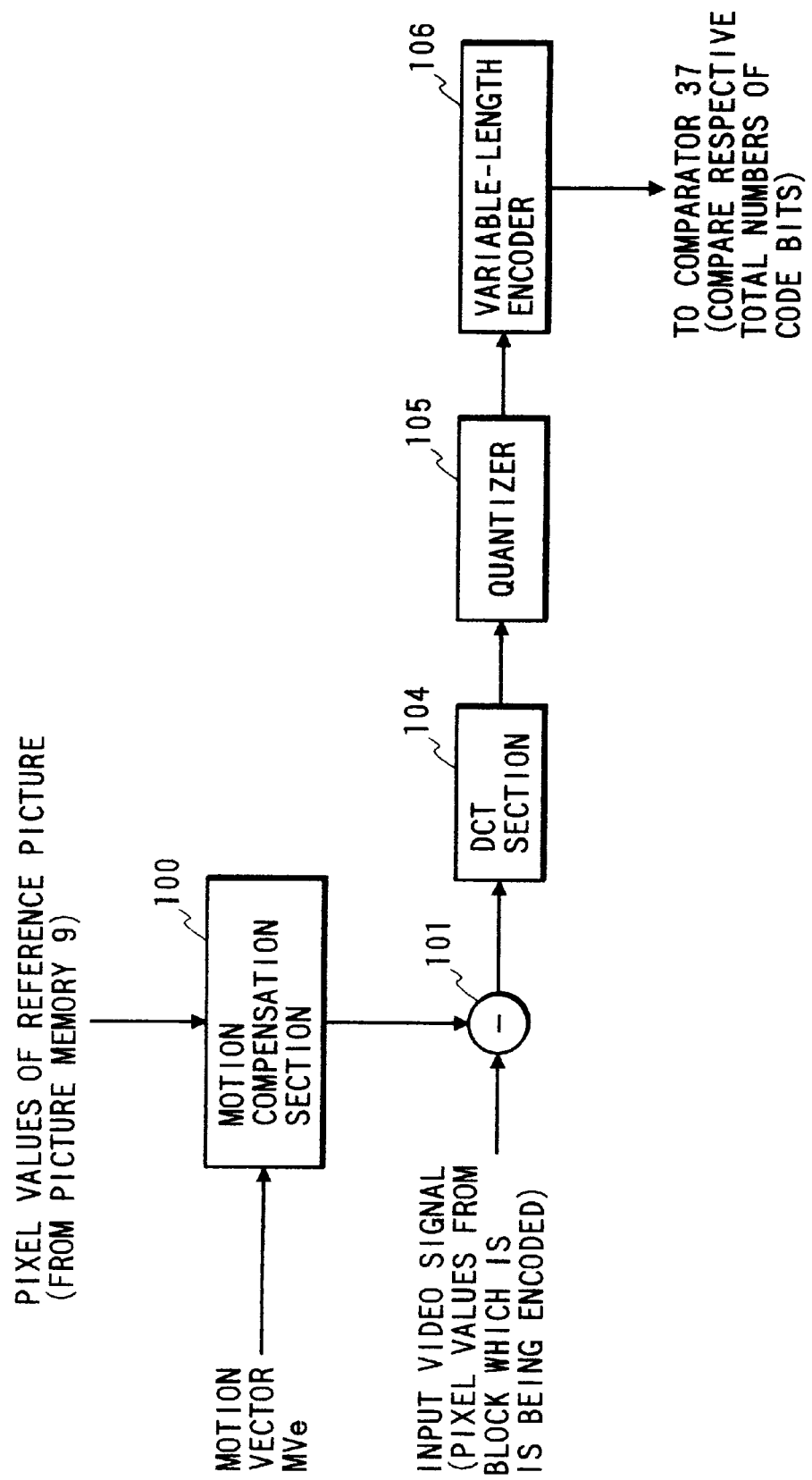
FIG. 8 is a block diagram showing an example of the configuration of a combination of an error amount detection section and an encoding section, used in the apparatus of FIG. 7.

The error amount detection and encoding section 36 can be configured for example as shown in FIG. 8. In this case, the total number of code bits which is generated for a block, as a result of variable-length encoding, is obtained and is input to the code bit total number comparator 37. The configuration of the error amount detection and encoding section 39 is identical to that shown in FIG. 8, but with the predicted motion vector MVp being supplied to the motion compensation section 100.

Figure 9:
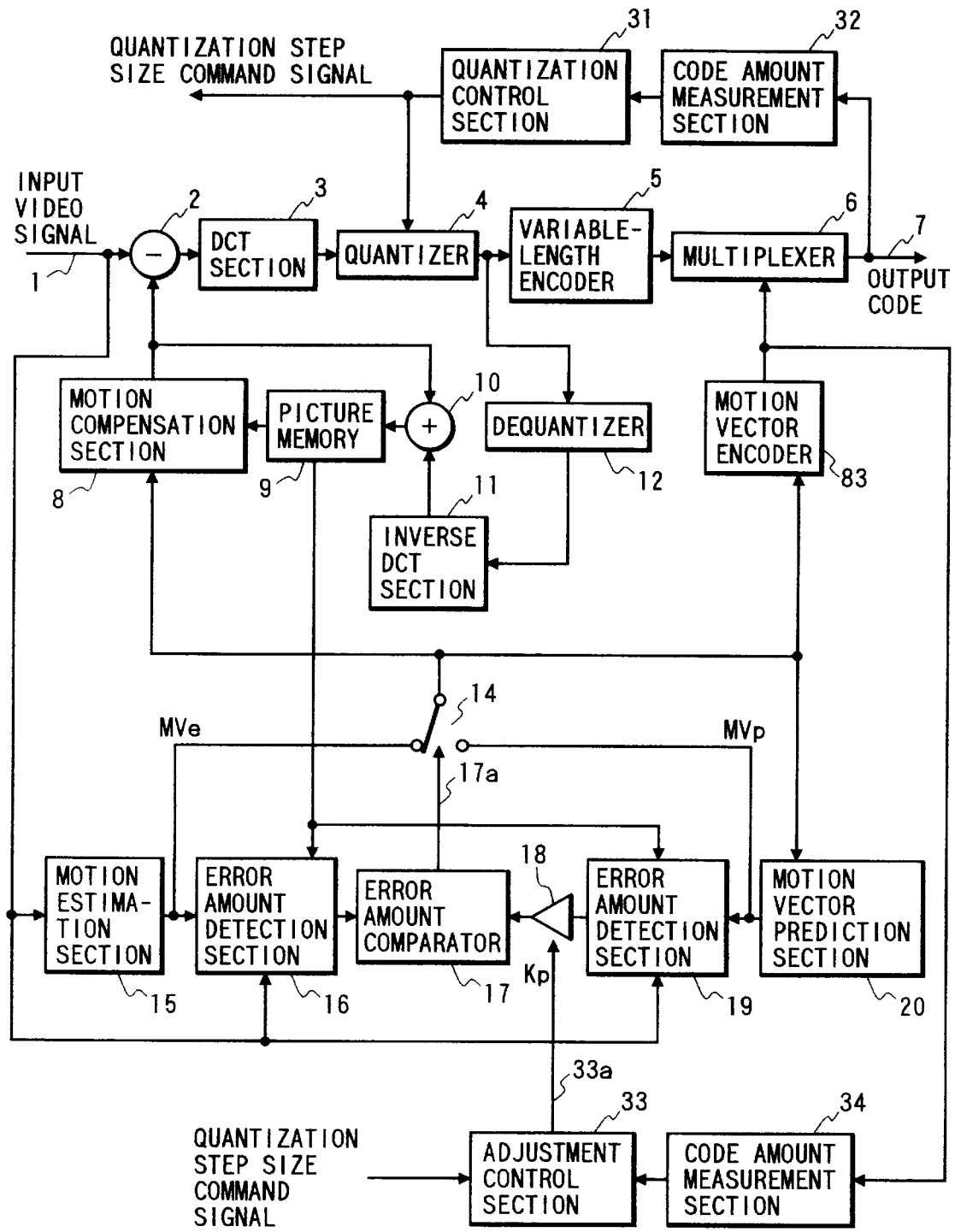
FIG. 9 is a general system block diagram of a second embodiment of a motion compensation encoding apparatus according to the present invention, in which prediction error amount adjustment is varied in accordance with generated amounts of code and quantization step size.
Figure 10:
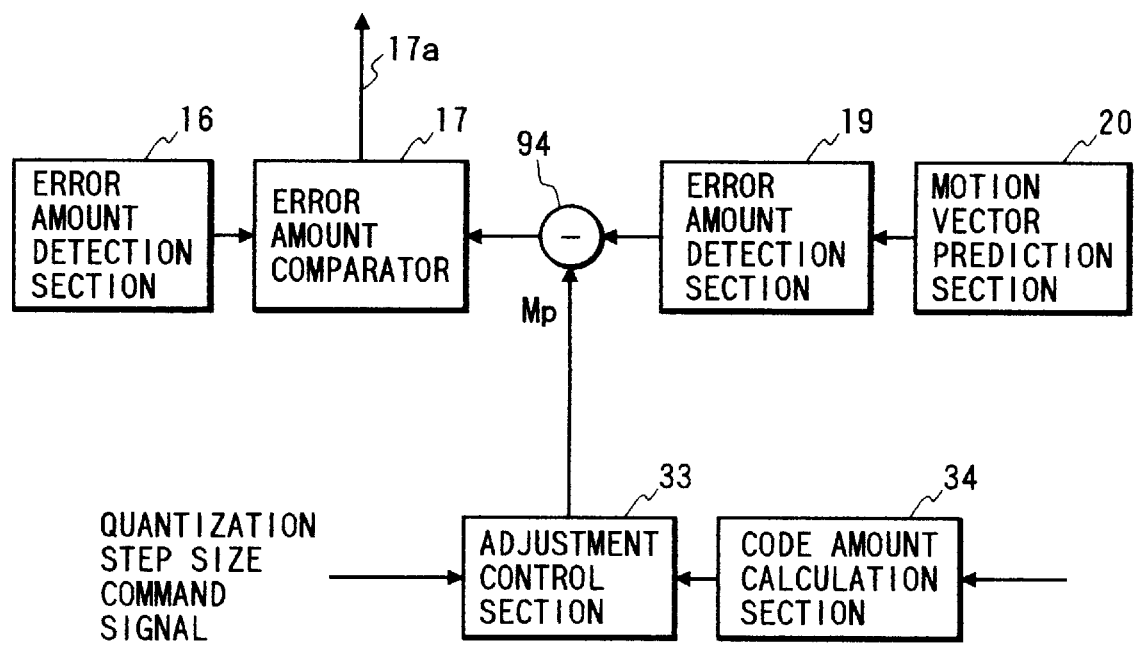
FIG. 10 is a partial system block diagram showing a modification of the embodiment of FIG. 9, whereby error amount adjustment is performed by subtractor rather than by factor multiplication.

A second embodiment of the invention will be described, with FIG. 9 being a general system block diagram showing the configuration of this embodiment. In FIG. 9, component which correspond to component in FIG. 1 are indicated by identical reference numerals. The embodiment of FIG. 9 differs from that of FIG. 1 by including a quantization control section 31, code amount calculation sections 32, 34, and an adjustment control section 33. In addition, the operation of the factor multiplier 18 is somewhat different from that of the embodiment of FIG. 1.

The code amount measurement section 32 monitors the overall amounts of code which are being generated by the apparatus, and supplies corresponding information to the quantization control section 31. The quantization control section 31 establishes a suitable value for the quantization step size, in accordance with the detected amount of generated code, and supplies corresponding step size information to the quantizer 4 and to the adjustment control section 33, e.g., as a quantization step size command signal as shown in FIG. 9. The quantization step size utilized by the quantizer 4 is determined in accordance with that step size information.

If the generated amount of code becomes greater than a predetermined target value so that it becomes necessary to reduce that amount of code, then the quantization control section 31 causes the quantization step size is increased, while if the generated amount becomes smaller than the target value then the step size is reduced. This is a conventional form of control of quantization.

The code amount measurement section 34 monitors the amount of code generated by motion vector encoding, and supplies corresponding information to the adjustment control section 33. In addition, the quantization step size information from the quantization control section 31 is also input to the adjustment control section 33. The adjustment control section 33 determines an appropriate value for the adjustment factor Kp in accordance with the amount of motion vector code and quantization step size value, in combination, and generates a corresponding adjustment factor control signal 33a which is supplied to the factor multiplier 18, causing the factor multiplier 18 to set the value of Kp to the value which has been determined.

As a result of controlling the adjustment factor Kp based on the generated amount of motion vector code, control is executed such that when the amount of motion vector code becomes excessively large, the adjustment factor Kp is reduced. In that way, since the value of the error amount AEp which results from using a predicted motion vector MVp is reduced by such adjustment, there is a higher probability that the predicted motion vectors MVp will be selected by the motion vector switch 14. As a result, due to the fact that variable-length encoding is utilized as described above, the amount of motion vector code will be reduced.

The reasons for controlling the adjustment factor Kp based on the quantization step size are as follows. The amount of code which is generated from encoding the DCT coefficients of the prediction error amounts of a block will vary in accordance with the quantization step size. When the step size is small, i.e. finely detailed quantization is performed by the quantizer 4, a large amount of difference in the generated amount of code may occur as a result of only a small amount of difference between successively obtained prediction error values which are supplied to the variable-length encoder 5. For that reason, when the quantization step size becomes small, this should tend to cause the value of Kp to be brought close to 1, i.e. to reduce the degree of adjustment which is applied to the prediction error amounts. Hence, the adjustment control section 33 responds to the quantization step size information by increasing the value of Kp as the quantization step size becomes smaller. The actual value of Kp is thereby determined by the adjustment control section 33 based upon both the quantization step size and the amount of code which is generated by encoding the motion vectors (i.e., the rate of generation of such code), with the relative effects of these two parameters on the adjustment factor being a matter of design choice.

The adjustment control section 33 can be configured using various known types of device, such as a read-only memory, so that detailed description will be omitted.

The embodiment of FIG. 9 can be modified in a similar manner to that described for the embodiment of FIG. 1 and described referring to FIG. 7, such as to compare respective amounts of code which are generated from encoding the prediction error amounts of a block, as a result of using the MVe and MVp motion vectors respectively. In that case the quantization which is performed in the error amount detection and encoding sections 36 and 39, when encoding the prediction error amounts, should be controlled to use the same quantization step size as that of the quantizer 4.

The invention also enables an improved high-efficiency encoded recorded medium to be obtained. This can be achieved by multiplexing the prediction error value bit streams and motion vector bit streams which are obtained by the motion compensation encoding apparatus embodiment of FIG. 1 or of FIG. 9 with bit streams expressing audio and control information, using a multiplexing standard such as MPEG, adding error-correction codes to the result, and recording on a recording medium after modulation.

In the case of a read-only type of recorded medium, the recording can be executed at high speed by using a stamper, etc.

Figure 12:
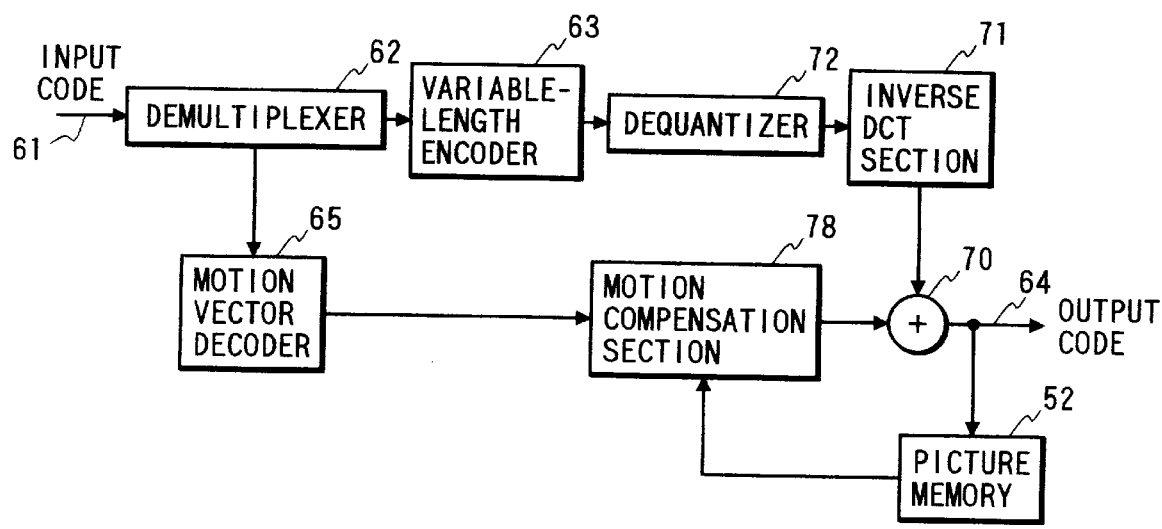
FIG. 12 is a general system block diagram of an example of a prior art type of decoder apparatus for use in conjunction with the motion compensation encoding apparatus of FIG. 11.

Basically it is possible to use a prior art type of decoding apparatus such as that of the example of FIG. 12, to decode the code stream which is generated by the motion compensation encoding apparatus embodiment of FIG. 1 or of FIG. 9. However it must be ensured that the motion vector decoder 65 operates in accordance with any motion vector prediction which is performed within the motion vector encoder 83 of FIG. 1, i.e. is configured to perform the inverse processing to that performed by the motion vector encoder 83. In the above description of the second embodiment of FIG. 9, it has been assumed that the adjustment of the respective prediction error amounts that are derived based on an estimated motion vector MVe and a predicted motion vector MVp is performed by means of a multiplication factor Kp of value less than 1, acting on MVp. However it would of course be equally possible to use any of the other methods of performing such adjustment, such as multiplying MVe by a factor which is greater than 1, etc., as described hereinabove for the first embodiment.

From the above description of embodiments it can be understood that with the present invention, a motion vector for a block which is to be encoded is predicted from motion vectors which have already been encoded, and if the degree of prediction error which is produced when using the predicted motion vector for motion compensation of the block does not differ greatly from the degree of prediction error which results from using a motion vector derived by motion estimation, then the predicted motion vector is utilized for motion compensation to encode the block, thereby enabling the amount of code which is generated by variable-length encoding of motion vectors to be reduced.

Furthermore, due to the fact that a predicted motion vector is only utilized for motion compensation encoding a block when there is only a small difference between the amount of prediction error resulting from using that motion vector and the amount of prediction error which would result from using the estimated motion vector), this method of utilizing predicted motion vectors can cause only a slight overall increase in the amounts of code which are generated by encoding the prediction error amounts. That is to say, since that amount of increased code will in general be substantially less than the amount of decrease in generated code (i.e. code generated by encoding of motion vectors) which results from using the predicted motion vectors, this enables a decrease in the overall amount of code which is generated by the motion compensation encoding apparatus.

Furthermore by varying the degree of adjustment which is applied to the prediction error amounts derived for a block by using the estimated motion vector and predicted motion vector respectively, and so thereby varying the proportion of predicted motion vectors which will be selected for use in motion compensation encoding, it becomes possible to control the degree of code reduction (i.e., reduction of encoded motion vectors) which results from using the predicted motion vectors, and to thereby control the overall rate of generation of code by the apparatus. That is to say, the degree to which such a reduction in generated code can be achieved is determined by the maximum amount of prediction error which is permissible for encoding each block. The encoding apparatus can thereby be designed to achieve a desired balance between the respective requirements for prediction error amount and reduction of generated code.

In particular, it becomes possible to control the adjustment factor, and hence the proportion of predicted motion vectors that are selected for use in motion compensation encoding, in accordance with detected levels of code which are generated by the apparatus, or in accordance with the quantization step size which is utilized in encoding the prediction error amounts derived for respective blocks (in the case of an apparatus in which the quantization step size is variable), or in accordance with some combination of these parameters.

What is claimed is:

1. A motion compensation encoding apparatus for converting a stream of pictures expressed by an input video signal into a code stream including encoded motion vectors corresponding to respective blocks of picture elements of said pictures, the apparatus comprising:

motion estimation means (15) for deriving, for each of said blocks, a corresponding estimated motion vector, first error amount detection means (16) for deriving, for said each block, a block prediction error amount which results from using said corresponding estimated motion vector to predict respective values of the picture elements of said block by motion compensation prediction, motion vector prediction means (20) for utilizing at least one previously encoded motion vector to derive a predicted motion vector for said each block, second error amount detection means (19) for deriving a second block prediction error amount which results from using said predicted motion vector to predict said values of the picture elements of said block by motion compensation prediction, comparator means (17) for comparing said first block prediction error amount and second block prediction error amount, to produce a comparison output indicative of a smaller one of said first block prediction error amount and second block prediction error amount, and selector means (14) responsive to said comparison output for selecting one of said estimated motion vector and predicted motion vector to be applied in motion compensation encoding of said each block and to be encoded as part of said encoded motion vectors.

2. The motion compensation encoding apparatus according to claim 1, comprising adjustment means (18) for adjusting at least one of said first block prediction error amount and second block prediction error amount, prior to execution of said comparison by said comparator means, in a direction tending to make the second block prediction error amount smaller than the first block prediction error amount.

3. The motion compensation encoding apparatus according to claim 2, wherein said adjustment means comprises factor multiplication means (18) for multiplying one of said first block prediction error amount and second block prediction error amount by a predetermined factor (Kp).

4. The motion compensation encoding apparatus according to claim 2, wherein said adjustment means comprises subtractor means (94) for subtracting a predetermined numeric value (Mp) from one of said first block prediction error amount and second block prediction error amount.

5. The motion compensation encoding apparatus according to claim 2, wherein said apparatus includes code amount calculation means (34) for measuring amounts of code which are generated by said apparatus, and wherein said apparatus further comprises adjustment control means (33) responsive to measurement results obtained by said code amount calculation means (34) for controlling said adjustment means (18) such as to increase a degree of said adjustment when relatively large amounts of said code are generated, and to decrease said degree of adjustment when relatively small amounts of said code are generated.

6. The motion compensation encoding apparatus according to claim 2, wherein said apparatus includes quantization means (4) and quantization control means (31) for generating a step size control signal to determine a quantization step size which is utilized by said quantization means, and wherein said apparatus further comprises adjustment control means (33) responsive to said step size control signal for controlling said adjustment means (18) such as to increase a degree of said adjustment when said step size is large and to decrease said degree of adjustment when when said step size is small.

7. An encoded recorded medium having recorded thereon high efficiency encoded information obtained by converting a stream of pictures expressed by a video signal into a code stream including encoded motion vectors, said motion vectors corresponding to respective blocks of picture elements of said pictures, said encoded motion vectors having been obtained by:

deriving, for each of said blocks, a corresponding estimated motion vector, deriving, for said each block, a block prediction error amount which results from using said corresponding estimated motion vector to predict respective values of the picture elements of said block by motion compensation prediction, utilizing at least one previously encoded motion vector to derive a predicted motion vector for said each block, deriving a second block prediction error amount which results from using said predicted motion vector to predict said values of the picture elements of said block by motion compensation prediction, comparing said first block prediction error amount and second block prediction error amount, to find a smaller one of said first block prediction error amount and second block prediction error amount, and selecting, in accordance with a result of said comparison, one of said estimated motion vector and predicted motion vector to be encoded as part of said encoded motion vectors.

8. A motion compensation encoding method for converting a stream of pictures expressed by a video signal into a code stream including encoded motion vectors, said motion vectors corresponding to respective blocks of picture elements of said pictures, the method comprising:

deriving, for each of said blocks, a corresponding estimated motion vector, deriving, for said each block, a block prediction error amount which results from using said corresponding estimated motion vector to predict respective values of the picture elements of said block by motion compensation prediction, utilizing at least one previously encoded motion vector to derive a predicted motion vector for said each block, deriving a second block prediction error amount which results from using said predicted motion vector to predict said values of the picture elements of said block by motion compensation prediction, comparing said first block prediction error amount and second block predict ion error amount, to find a smaller one of said first block prediction error amount and second block prediction error amount, and selecting, in accordance with a result of said comparison, one of said estimated motion vector and predicted motion vector to be applied in motion compensation encoding of said each block and to be encoded as part of said encoded motion vectors.

9. The encoding method according to claim 8, further comprising:

adjusting at least one of said first block prediction error amount and second block prediction error amount, prior to execution of said comparison, in a direction tending to make said second block prediction error amount smaller than said first block prediction error amount.

* * * * *